United States Patent [19]

Toushin

[11] Patent Number: 5,500,245

[45] Date of Patent: Mar. 19, 1996

[54] WATER-REPELLENT EARTH MATERIAL, AND METHODS OF MAKING AND USING THE SAME

[76] Inventor: Kazumi Toushin, 2105 Hayashi, Kurashiki-shi, Okayama-ken, Japan

[21] Appl. No.: 280,452

[22] Filed: Jul. 26, 1994

[30] Foreign Application Priority Data

Dec. 9, 1993 [JP] Japan .................................. 5-340850

[51] Int. Cl.⁶ ............................................... B05D 7/00
[52] U.S. Cl. ............................. 427/221; 427/387; 405/264
[58] Field of Search .................................... 427/221, 387; 405/264

[56] References Cited

FOREIGN PATENT DOCUMENTS

| 20737 | 4/1967 | Australia . |
| 20737/67 | 10/1968 | Australia . |
| 62-179588 | 1/1988 | Japan . |

*Primary Examiner*—Shrive Beck
*Assistant Examiner*—David M. Maiorana
*Attorney, Agent, or Firm*—Michael D. Bednarek; Marks & Murase

[57] ABSTRACT

A water-repellent earth material having grains formed with silicone coating is made by mixing the earth material with an emulsion of silicone oil in water and drying. The earth material may be selected from the group consisting of soil, sand, gravel, pebbles, silicon-containing combustion ash of household refuses and silicon-containing combustion ash of industrial refuses. The earth material may be used to form a water-repellent ground surface layer, a water-repellant underground layer or a water-repellent enclosure for various purposes.

5 Claims, 2 Drawing Sheets

WATER-REPELLENT EARTH MATERIAL, AND METHODS OF MAKING AND USING THE SAME

BACKGROUND OF THE INVENTION

1. Field of the Invention:

This invention generally relates to earth materials, and more particularly to an earth material which is treated to have water repellency. The present invention also relates to methods of making and using a water-repellent earth material.

2. Description of the Related Art:

Conventionally, unwanted weeds at various sites (e.g. non-paved median strip of a highway, an athletic ground, or a tee ground of a golf course) have been removed manually or by using a mower or by spraying a chemical (herbicide). However, manual or machine mowing is laborious and must be repeated periodically, whereas the chemical weed removal gives rise to a pollution problem in addition to requiring periodical repetition of the same operation.

On the other hand, it is often necessary to adjust the ground or earth condition in various ways. For instance, it is preferable that sports grounds be adjusted to have good water drainage. Conversely, grounds in scarcely rainy areas need be adjusted to have good water retention for growing various plants.

SUMMARY OF THE INVENTION

It is, therefore, an object of the present invention to provide a water-repellant earth material which is non-harmful and can be used for various purposes including e.g. prevention of weed growing, facilitation of ground drainage, or improvement of ground water retention.

The present invention also seeks to provide a method of making a water-repellant earth material.

The present invention further provides various ways of using a water-repellant earth material.

According to one aspect of the present invention, there is provided a water-repellant earth material having grains formed with silicone coating. The earth material may be selected from the group consisting of soil, sand (either pit sand or sea sand), gravel, pebbles, silicon-containing combustion ash of household refuses and silicon-containing combustion ash of industrial refuses.

According to another aspect of the present invention, there is provided a method of making a water-repellant earth material comprising the steps of: drying a start earth material; preparing an emulsion of silicone oil in water; soaking the earth material with the emulsion; and heating the soaked earth material for drying.

The water-repellant earth material thus made may be simply spread over the surface of a selected plain ground (namely, where no plants are grown) to form a water-repellant surface layer. Alternatively, plants may be grown on the ground, and the surface layer may have openings only at the plants.

According to another use example, the earth material may form a water-repellant underground layer in a selected ground where plants are grown, and the underground layer is located below the roots of the plants.

According to a further use example, the earth material forms a water-repellant underground layer of the earth material in a selected ground, and the underground layer is inclined and extending to a draining means.

According to still another use example, the earth material may form a water-repellant enclosure of the earth material for containing contaminated wastes, and the enclosure is buried in a selected ground.

Other objects, features and advantages of the present invention will be fully understood from the following detailed description given with reference to the accompanying drawings.

DETAILED DESCRIPTION OF THE PREFERRED EMBODIMENTS

Figure 1:
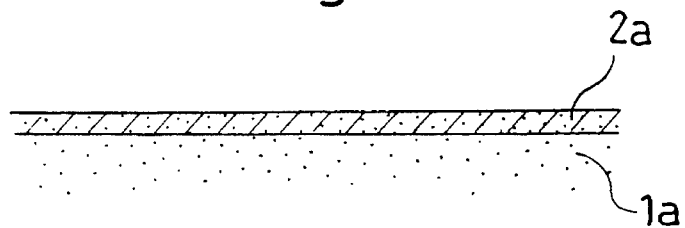
FIG. 1 is a view showing a first use example of a water-repellant earth material according to an embodiment of the present invention.

The present invention is now described on the basis of the preferred embodiments which include Examples 1 through 6. Of these, Example 1 refers to a method of making a water-repellant earth material, whereas Examples 2 through 6 refer to different applications of the water-repellant earth material thus made.

EXAMPLE 1

Decomposed granite soil is selected as a starting material because it is readily available at a relatively low cost and easy to handle. The material soil is subjected to screening by a known sieve device (not shown) to have grain size up to 10 mm.

However, such a grain size is selected only for the convenience of the subsequent process steps, so that the grain size itself is not critical for the present invention.

Then, the material soil is heated to a temperature of about 180°–200° C. for drying to a water content of up to 5%. Such drying may be performed for about 2–3 minutes while agitating in a mixer (not shown). The heating temperature and time may be determined depending on the kind, volume and the like of the material soil.

Then, 3 parts by volume of silicone oil is mixed with 1,000 parts by volume of water and agitated in a mixer (not shown) to form silicone oil emulsion. The mixture ratio between silicone oil and water may be increased or decreased depending on the kind, grain size and the like. For instance, when the starting material is sand, the proportion of silicone oil may be decreased. It should be appreciated that silicone oil, which may be commercially available from any supplier, is a synthetic oil which is colorless, odorless and transparent. It should be also appreciated that the silicone oil emulsion is preferably used immediately after preparation because such immediate use of the emulsion may make it unnecessary to use a separate emulsifier or stabilizer.

Then, the emulsion is mixed with the dry material soil in a mixer (not shown) with a mixture ratio of 20 liters of the emulsion to 1 ton of the dry material soil, and the mixture is stirred at normal temperature for about 10 minutes.

Finally, the mixture is dried in a drier (not shown) for water evaporation at a temperature of 180°–200° C. As a result, water-repellant granite soil is obtained wherein silicone coating is formed on the surfaces of the soil grains.

The product soil thus obtained has been found to exhibit excellent water repellancy but excellent air permeability. Further, the product soil will exhibit resistance to high and low temperatures; it will neither decompose below 260° C. nor freeze even at −50°C. Moreover, the product soil is non-poisonous and odorless, so that it will give no adverse influence to the ecosystem even if it is taken into animals and plants. Conversely, the product soil can be heated to no less than 260° for decomposition to the starting soil with attendant production of elemental silicon (Si) and water.

Further, the production process described above does not require any special equipments. Thus, the water-repellant earth material can be produced at a low cost.

EXAMPLE 2

As shown in FIG. 1, the product soil obtained in Example 1 is simply spread over the surface of a selected ground 1a to form a water repellant surface layer 2a having a thickness of 5–10 cm. The ground 1a may be non-paved median strip of a highway or an athletic ground for example.

The water-repellant surface layer 2a can prevent penetration of water into the ground 1a, thereby preventing growing of weeds (namely, budding of seeds) and frosting of the ground 1a. Further, the surface layer 2a assists draining of rainwater to facilitate drying of the ground 1a a under the influences of solar heat and wind, thereby preventing the ground 1a from getting muddy.

EXAMPLE 3

Figure 2:
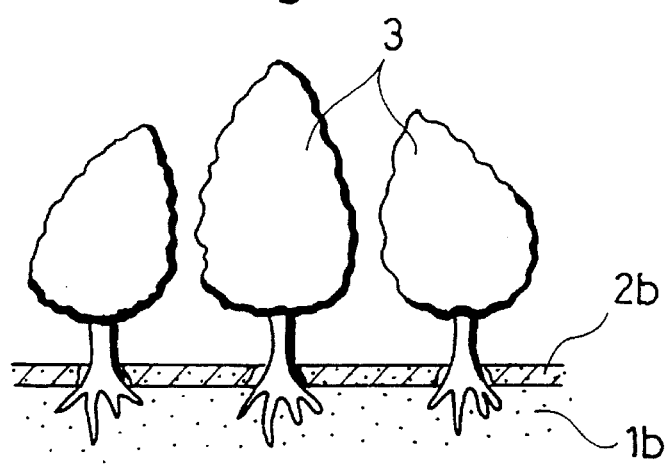
FIG. 2 is a view showing a second use example of the same earth material.

As shown in FIG. 2, the product soil obtained in Example 1 is spread to form a water-repellant surface layer 2b with a thickness of 5–10 cm over the surface of a selected ground 1b on which trees 3 or other plants are grown. The surface layer 2b has clearances around the trees 3 for allowing selective water penetration into the ground 1b at the clearances, as required for growing the trees 3.

Like Example 2, the water-repellant surface layer 2b prevents growing of weeds and frosting of the ground 1a while also assisting water draining. Thus, Example 3 is advantageous for enabling selective growing of plants in a rainy area.

EXAMPLE 4

Figure 3:
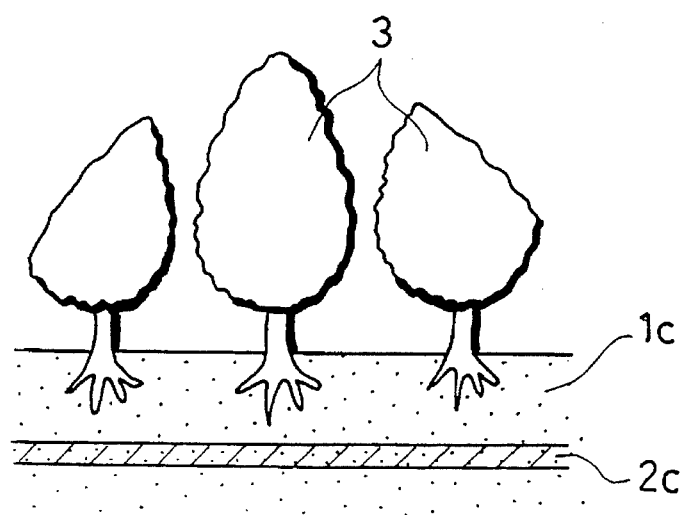
FIG. 3 is a view showing a third use example of the same earth material.
Figure 4:
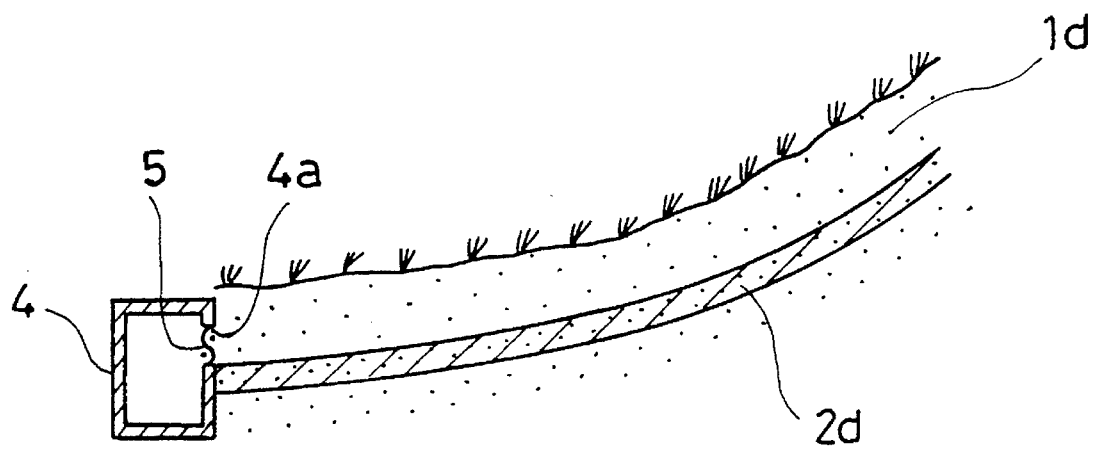
FIG. 4 is a view showing a fourth use example of the same earth material.

As shown in FIG. 3, the product soil obtained in Example 1 is used to form a water-repellant underground layer 2c with a thickness of 5–10 cm at a suitable depth from the surface of a selected ground 1b on which trees 3 or other plants are grown.

As opposed to Example 2, the water-repellant underground layer 2c of Example 3 prevents downward escaping of water beyond it, thereby retaining water which is required for growing the trees 3. Thus, Example 3 is advantageous for enabling growing of plants in a rain-deficient area.

EXAMPLE 5

As shown in FIG. 2, the product soil obtained in Example 1 is used to form a water-repellant underground layer 2d with a thickness of 5–10 cm at a suitable depth from the surface of a selected ground 1d which may be typically the grass field of a golf course where argricultural chemicals are often used. The underground layer 2d is in the form of an inclined guide plate or trough for guiding harmful chemical-containing water to an underdrain 4 having an opening 4a located to admit entry of the chemical-containing water flowing down along the water-repellant layer 2d. The opening 4a of the underdrain 4 is provided with a filter mesh 5 for preventing soil grains of the ground 1d from entering into the underdrain 4.

According to Example 5, the harmful chemical-containing water may be collected at a tank (not shown) connected to an end of the underdrain 4. Thus, the pollution problems in the neighborhood of the golf course can be solved.

EXAMPLE 6

Figure 5:
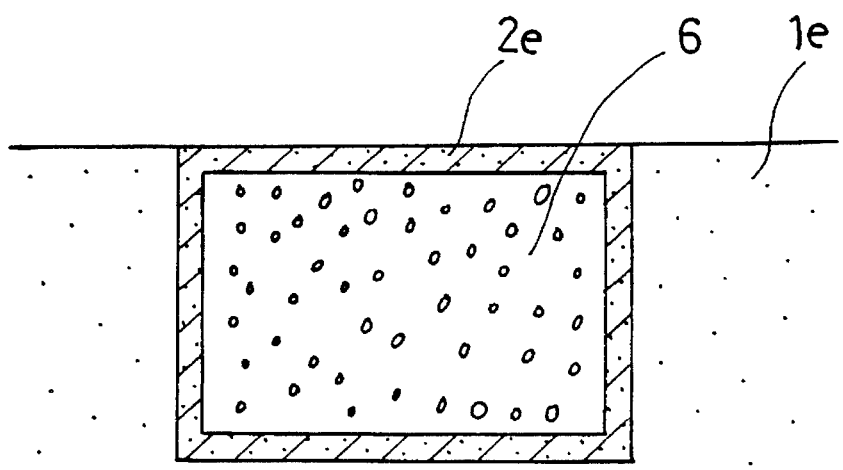
FIG. 5 is a view showing a fifth use example of the same earth material.

As shown in FIG. 5, an amount of contaminated soil 6 containing industrial wastes is dumped into a pit or hole of a selected ground 1e and enclosed in a water-repellant soil enclosure 2e. The thickness of the enclosure may be determined depending on various requirements such as the nature of the contaminants and desired enclosure durability.

According to Example 6, the harmful contaminants contained in water content can be prevented from flowing out of the enclosure 2e, thereby eliminating the pollution problems caused by industrial wastes.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

I claim:

1. A method of making a water-repellent earth material comprising the steps of:

heating a starting earth material for drying;

preparing an emulsion of silicone oil in water;

soaking the earth material with the emulsion; and heating the soaked earth material for drying.

2. The method according to claim 1, wherein the material is selected from the group consisting of soil, sand, gravel, silicon-containing combustion ash of household refuses and silicon-containing combustion ash of industrial refuses.

3. The method according to claim 1, wherein the heating of the starting earth material is performed at a temperature of 180°–200° C.

4. The method according to claim 1, wherein the heating of the starting earth material is performed for 2–3 minutes while agitating in a mixer.

5. The method according to claim 1, wherein the heating of the soaked earth material is performed at a temperature of 180°–200° C.

* * * * *